May 21, 1935.   N. T. BROWN   2,001,703
HEATING MEANS FOR TREATING VEGETABLES OR FRUIT
Filed Sept. 23, 1931   2 Sheets-Sheet 1
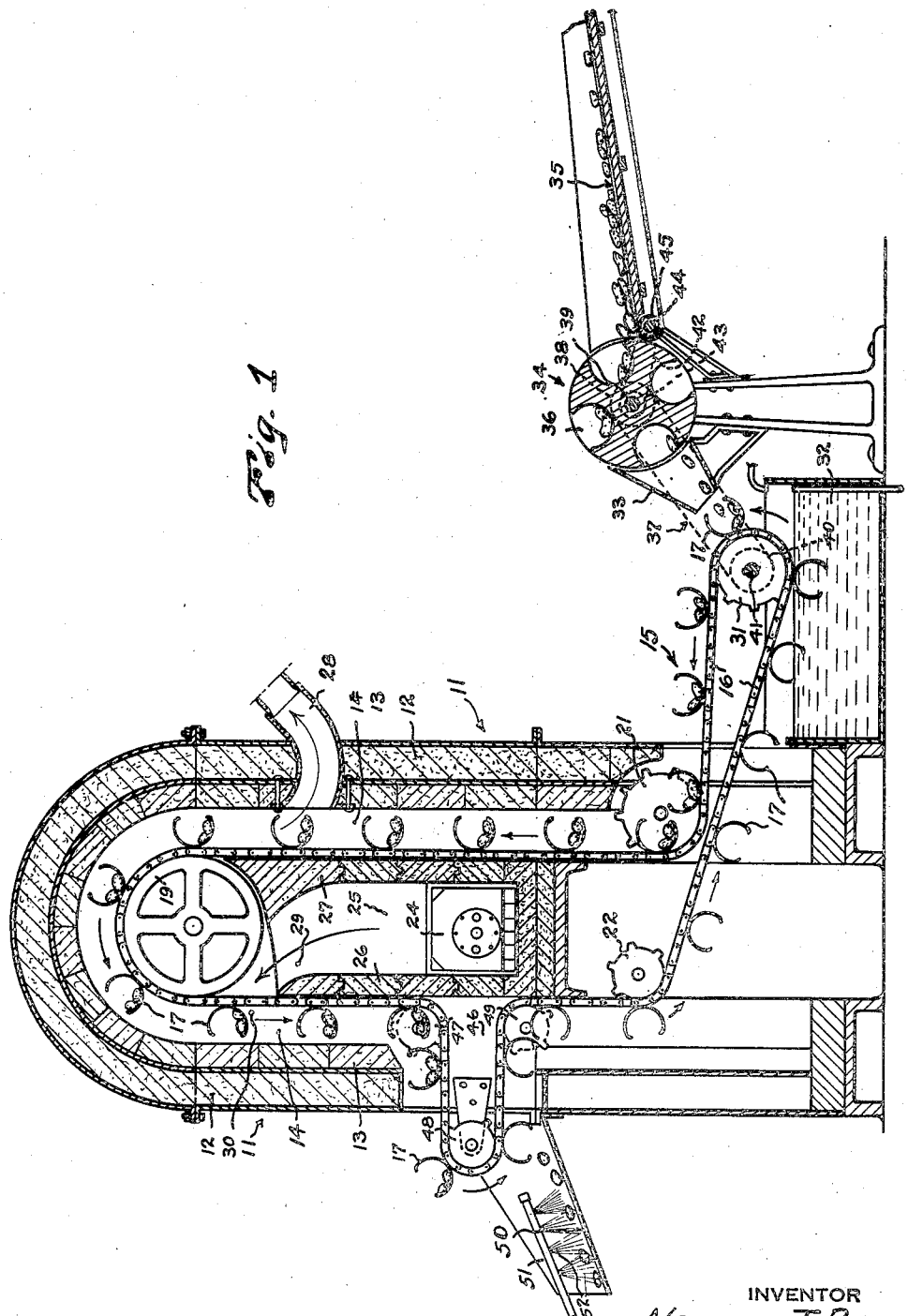
INVENTOR
Newman T. Brown
BY
ATTORNEY

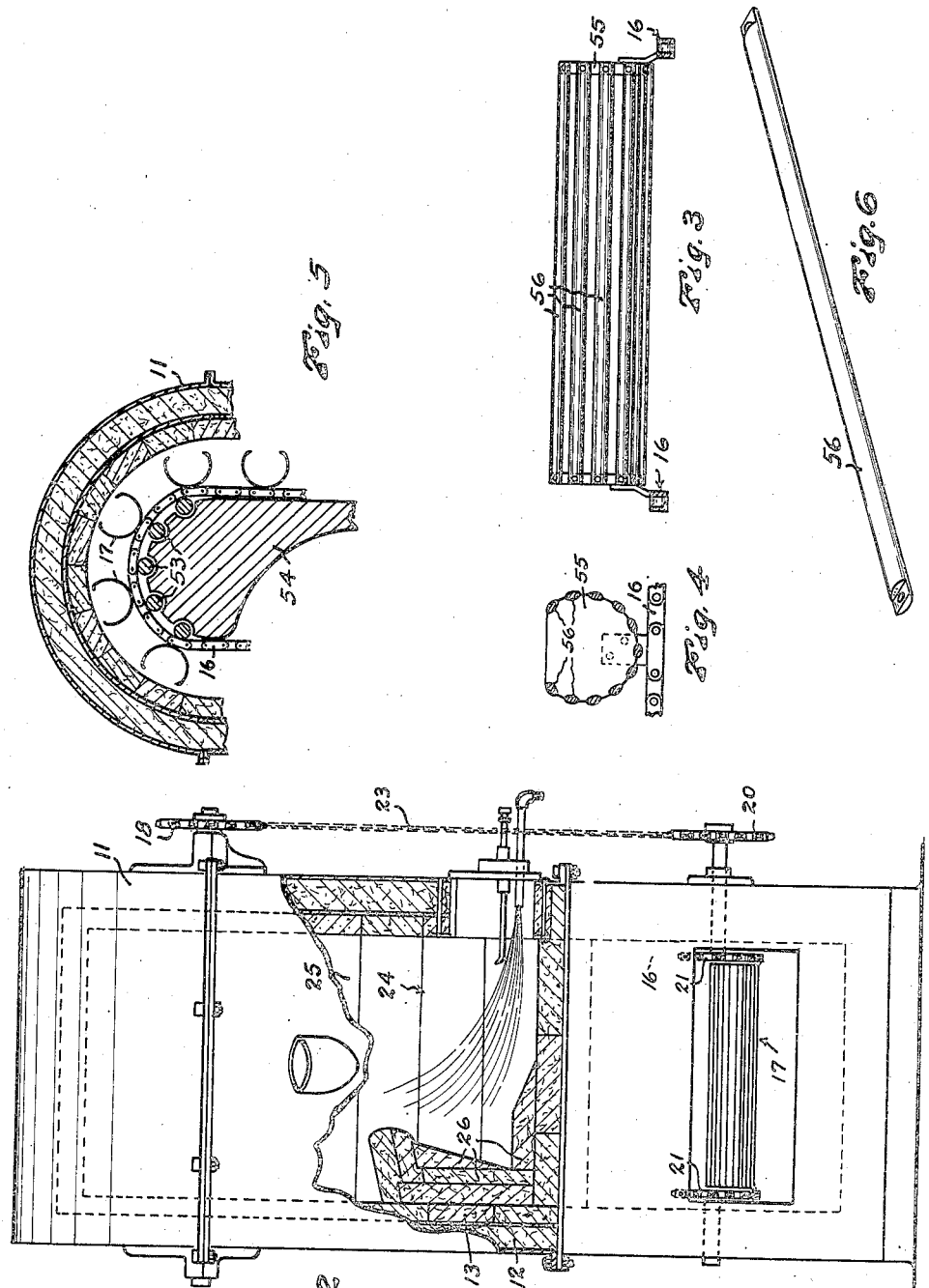

Patented May 21, 1935

2,001,703

UNITED STATES PATENT OFFICE 2,001,703

HEATING MEANS FOR TREATING VEGETABLES OR FRUIT

Newman T. Brown, Seattle, Wash., assignor to Albert Peter Grommesch, Seattle, Wash., deceased, now by decree of distribution to Katherine H. Grommesch Application September 23, 1931, Serial No. 564,698

3 Claims. (Cl. 126—41)

My invention relates to a heating means or furnace device for suddenly exposing vegetables and fruit to heat to loosen their skin or protective coating. More particularly, my invention relates to a heating means whereby the period of exposure, of the article to be treated, may be definitely controlled, so that under heating and over heating may be avoided, and further so that, as in the case of the Irish potato (Solanum tuberosum) for example, a protective coating may be formed of the cortex layer located immediately beneath the corky layer. Particularly is my device adapted as a means of carrying out the process of treating Irish potatoes (Solanum tuberosum) as set forth in a co-pending application, filed by Samuel Allan Patterson, bearing Serial No. 556,033, to remove the outer or corky layer and to provide a protective coating formed from the cortex layer, and the product of such process.

For purposes of definiteness of illustration and clearness of description, I will describe my invention as particularly applied to Irish potatoes (Solanum tuberosum), but it will be understood that my invention is not limited to said vegetable only, but is equally applicable to other root vegetables and fruits. As one example of fruits, the skins of apples have been readily removed and a suitable product resulting for use by pie manufacturers has been provided.

In the operation of my device, potatoes, as harvested, are preferably washed or otherwise cleaned and thereafter introduced into my furnace, which furnace is provided with a moving endless chain carrying a plurality of especially designed buckets. The form of the bucket is such as to aid the potatoes in turning or changing their position within the bucket, while the bucket is moving, in order that the potatoes continually change their contact points with the bucket. The temperature of the heat required is varied to suit the particular article being treated and such heat is characterized by contacting or directly impinging upon the article being treated, such as occurs when the article is subjected to burning gases. By causing the potato to change position, no part is allowed to be acted upon by the heat of the bucket or any supporting element. More definitely, the heat is that derived directly from a flame preferably that of an oil burner; or, more generally expressed, directly from a combustion chamber. The vegetable is exposed to this flame in a pocket or heat zone for a length of time of the order of seconds. For potatoes this period is preferably not less than seven seconds nor more than twenty-five.

A primary purpose of my invention is to provide a heating means, having a chamber in which the heat may be pocketed, and while so pocketed, cause to act upon the potatoes, vegetables or fruit which may be passed therethrough, the character of said chamber being such that the articles may be suddenly introduced into said heat and may be maintained therein for a pre-determined period of time and may be then suddenly removed from said heat, all to the end that the article may be given a sudden shock of heat, the duration of which is subject to control.

A further primary purpose of my invention is to provide a heating means in a chamber of curved form, so that the heated stream of gas or air, or flame envelopes the article being treated.

A further primary purpose of my invention is to provide for the sudden cooling of the article after being exposed to said heat, and to provide means for cooling the conveyor means, which takes the articles into the above pocket or zone of heat.

A further primary purpose of my invention is to provide a heating means of a character capable of treating such vegetables and fruits on a large scale.

The above mentioned general objects of my invention, together with others inherent in the same, are attained by the device illustrated in the following drawings, the same being preferred exemplary forms of embodiment of my invention throughout which drawings like reference numerals indicate like parts.

Referring to the drawings:

Figure 1 represents a vertical view in section of a preferred form of furnace embodying my invention.

Fig. 2 is a longitudinal view in elevation with parts broken away.

Fig. 3 is a longitudinal side view of a bucket of squirrel cage type, rigidly mounted, relative to an endless chain.

Fig. 4 is a view in cross section on line 4—4 of Fig. 3.

Fig. 5 is a view of a modified form of said furnace, as respects the chamber part.

Fig. 6 is an enlarged view of the bars forming said buckets.

The furnace casing generally indicated by numeral 11, is formed having an outer insulated wall 12, lined with fire brick 13, and channel way 14, extending lengthwise and up one side across the top and down the other side of said furnace.

A conveyor referred to in general as 15, which may be in the form of an endless chain 16 and buckets 17, which are preferably of a squirrel cage type having bars of relatively flat or oval contour and preferably rigidly mounted with respect to said chain, is operatively mounted to move in the said channel way 14 by passing over drum 19 located in the upper part of the furnace, and driving gear 21 and gears 22 and 31. Driving gear 20 is connected to a source of power, not shown, and is nonrotatably mounted on the same shaft as driving gear 21. Obviously the pulleys or drums which are driven or are driving, is a matter of mechanics not involved in the invention, the selection herein set forth being arbitrary for operativeness.

Drum 19 is preferably of cast iron, fire brick, carbon or other heat resisting material and is preferably provided with a plane surface over which the conveyor passes without intermeshing teeth, so that the fitting problem incident to expansion due to heat is avoided, however, manifestly intermeshing teeth may be employed if desired. A sprocket chain 23 connects sprocket 18 with sprocket 20 to cause said drum 19 to move in synchronism with said conveyor 15.

A suitable heating unit, preferably an oil burner means 24, is mounted within and intermediate the height of the furnace casing 11. A fire box chamber 25 is formed above said heating unit 24 having fire brick walls 26 and 27.

Flue 28 provides for leading the flame through the channel way 14 to the chimney (not shown). Walls 26 and 27 are preferably curved at 29 to cause the flame to pass and be deflected into the channel way 14 and to form a protection for the drum 19. Drum 19 forms a movable wall for a part of the channel way 14. A part of the channel way, extending from the point 30 to the flue 28, may be called the heating zone. Since the said drum forms a moving wall for the heating zone chamber, it functions also to maintain a uniformity of temperature throughout the said heating zone. The rotation of the drum tends to prevent any one section thereof from becoming excessively hot. Sprocket 31, around which conveyor 15 passes, is placed to one side of the furnace and is preferably above a cooling means 32, which cooling means may consist of a bath of water constantly changed into which the conveyor belt is immersed. Said sprocket 31 also forms a means to present the openings of the buckets 17 to a feeding hopper 33 operatively disposed with respect to an automatic timing-feeding or loading means 34, which means 34 separate a stream of articles, as for example, potatoes, on a conveyor 35 into separate lots of pre-determined amounts. Said timing-feeding, or loading means 34 delivers the separate lots of articles at proper intervals to the buckets 17. This loading means 34 may be a drum having pockets 36 in its peripheral portion, said pockets being revolved at such time intervals as is necessary to discharge the articles at a time when the open side of the buckets 17 are presented to hopper 32.

Driving means in the form of a sprocket chain 37 may connect sprocket 38 on the shaft 39 of feed means 34 with a sprocket 40 keyed on shaft 41. Sprocket 31 is fixedly secured to shaft 41 over which the conveyor 15 passes. Sprocket chain 42 may connect sprocket 43 to sprocket 44 on drum 45 so that synchronism of all these parts is established.

The rear wall 11 preferably forms a recess 46 into which conveyor belt 15 passes. Idle sprockets 47, 48 and 49 are provided to prevent slack and to position the travel of the conveyor belt 15 into and out of the recess. A discharge chute 50 is provided below the drum 48 so that the articles will fall therein after being discharged from the buckets 17. A cooling means 51 comprising a water spray 52 may be suitably located in the discharge opening 50 of the furnace to cause a discharge of water or other cooling fluid to contact the articles being treated, so that the heat in the articles may be promptly removed, if desired. This cooling means is preferably positioned in the rear wall so that the articles will be cooled immediately upon their removal from the heating zone chamber. I have found that most satisfactory results are obtained by the specific positions herein shown of the discharge opening and the cooling means, however, I do not wish to be understood as limiting myself to this specific arrangement, as the discharge and cooling system may be positioned adjacent sprocket 22 or the articles may be cooled by a spray directly into the buckets 17.

When my device is used in connection with my skinning machine set forth in my co-pending application, bearing Serial No. 562,907, the cooling means may be eliminated and the cooling effect providing simultaneously with the rubbing treatment given articles in the said skinning machine. In said skinning machine the skin is removed and the cooling effect will be provided simultaneously with the skinning of the article so that setting of the agglutinant material under the skin is prevented, which setting would tend to secure the skin to the article.

In the modified form of the invention shown in Fig. 5, drum 19 is omitted and rollers 53 disposed in pockets in the bricked lined wall 54 are provided to facilitate the moving of the conveyor 15 there over.

The buckets 17 comprise ends 55, which are preferably of substantial semi-circular shape in elevation and bars 56. These ends 55 have the bars 56 secured around their lower sides as indicated in Fig. 4 to provide means of discharge and entrance of articles on the top. The bars are spaced apart to provide openings thru which the articles may not pass and to make the articles freely accessible to the flames. These openings further provide an irregular periphery tending to prevent sliding of the articles in the buckets and also tending to cause the articles to turn as they move in the buckets. Thus I have provided a bucket wherein the articles are gradually and uniformly turned as they are exposed to the heat so that no part of the skin is bruised or torn in the bucket, which bruised or exposed parts of articles, if obtained, would be affected by the heat and thereby burned or scorched.

The mode of operation of the heating means or furnace, embodying my invention is set forth above in large part. Manifestly in providing the curved heating zone, a curved route for the stream of flame or combustion gases results so that the said stream is caused to be deflected from the drum and to curve through the heating zone on its way to the flue 28. Furthermore, the bars of the buckets operate to break up the stream of flame or combustion gases and provide uniformity of temperature in said heating zone.

The form of the heating zone being curved and the buckets being rigidly mounted to the chain 16 results in causing the articles to be continually turned while passing through the heating zone so that different parts of the squirrel cage are successively caused to support the articles, first one side, then the bottom and then the other side of the bucket receives the articles being treated as illustrated in Fig. 1. Manifestly the heat has direct access to all sides of the articles being treated and no supporting surface of the bucket remains continuously in contact with a specific portion of the article to either prevent the free access of the flame to said article or to allow a heated bar to contact an article for too long a period. Thus further provision for uniformity of the application of heat to the article is provided.

I have indicated by arrows in Fig. 1 that the buckets 17 are moved in a direction against the stream of the flame. This is the preferred direction of movement in order to secure the maximum effect of the heat of the flame. As the buckets 17 are moved in a direction opposite to the stream of flame, the articles being treated are moved towards the source of the heat and thus compensation is made for the heat absorbed by the articles previously contacted, and thereafter the articles may be suddenly discharged after contacting that part of the flame stream where maximum temperature is obtained.

Obviously, changes may be made in the forms, dimensions, and arrangement of the parts of my invention, without departing from the principle thereof, the above setting forth only preferred forms of embodiment.

I claim:

1. A heating means of the character described embodying a heating chamber of inverted U channel form, one leg of said chamber functioning as an article inlet passageway and the other leg functioning as an article outlet passageway; an article inlet port disposed in said article inlet passageway; a fire-box disposed between the leg members of said heating chamber and in communication with the article outlet leg of said chamber at a point above the said outlet port; a draft outlet for said fire-box in communication with the article inlet leg of said heating chamber at a point above the article inlet port; and a conveyor means operatively disposed to move through said heating chamber, whereby a heating means is provided of a form in which the heat may be pocketed and articles passed through said pocket of heat.

2. In a heating means of the character described having a heating chamber of inverted U-channel form, a firebox disposed below said heating chamber and in communication with the article outlet leg of said chamber and a draft outlet for said firebox in communication with the article inlet leg of said heating chamber, an endless conveyor chain means; guide mounting means over and around which said conveyor means travels, whereby said chain means may be caused to turn about an axis; and a cage bucket rigidly mounted on said chain means, said bucket being formed of substantially semicircular end members and transversely disposed bars mounted on the arcuate peripheral portion of said end members, whereby an article placed in said bucket will be caused to rest on different parts of said bucket at different points of the travel of said conveyor about said axis, and all points of the surface of said article will be exposed through said bars to the exterior of said bucket.

3. In a heating means of the character described having a heating chamber of inverted U-channel form, a firebox disposed below said heating chamber and in communication with the article outlet leg of said chamber and a draft outlet for said firebox in communication with the article inlet leg of said heating chamber, an endless conveyor chain means; guide mounting means over and around which said conveyor means travels, whereby said chain means may be caused to turn about an axis; and a cage bucket rigidly mounted on said chain means, said bucket being formed of substantially semicircular end members and transversely disposed bars of oval shape in cross section mounted on the arcuate peripheral portion of said end members, whereby an article placed in said bucket will be caused to rest on different parts of said bucket at different points of the travel of said conveyor about said axis, and all parts of the surface of said article will be gradually and uniformly turned and exposed through said bars to the exterior of said bucket.

NEWMAN T. BROWN.